July 4, 1939.  A. T. HARDING  2,164,742

ELECTROLYTIC CAPACITOR

Filed March 30, 1935

Witness:

INVENTOR:
Arthur T. Harding
BY Goldsborough
ATTORNEY

Patented July 4, 1939

2,164,742

UNITED STATES PATENT OFFICE 2,164,742

ELECTROLYTIC CAPACITOR

Arthur T. Harding, Audubon, N. J., assignor to Radio Corporation of America, a corporation of Delaware Application March 30, 1935, Serial No. 13,813

3 Claims. (Cl. 175—315)

My invention relates to improvements in electrolytic capacitors of the so-called "dry" type and electrolytes therefor.

A capacitor of the character referred to comprises electrodes of film-forming material provided over the respective surfaces thereof with a dielectric film, and an electrolyte interposed between the electrodes, the component parts being stacked or placed together in the form of sheets and rolled to form the capacitor.

One of the objects of my invention is to provide an electrolytic capacitor of the character referred to which has advantages over those proposed heretofore in the way of higher capacity, lower power factor, freedom from sparking, absence of appreciable deterioration, and cheapness and ease of manufacture.

Another object of my invention resides in the provision of an improved electrolyte and method of manufacturing the same to provide a non-flowing, adhesive and cohesive electrolyte which can be readily applied to foil electrodes in the form of a thin sheet serving both as an electrolyte and as the sole spacing and securing means between the adjacent foil electrodes, so that no retaining means are necessary to maintain the electrolyte between the electrodes, the electrolyte being characterized by the fact that it will not dry out or deteriorate when exposed to the atmosphere, thus making unnecessary a sealed casing for the assembled electrodes and electrolyte.

Other objects and advantages will hereinafter appear.

In accordance with my invention, an electrolytic capacitor is made up of electrodes of film-forming material provided over the respective surfaces thereof with a dielectric film, and an electrolyte interposed between and separating the electrodes and being of sufficient viscosity and consistency to function both as spacer and electrolyte.

Further, in accordance with my invention, an electrolyte of the character referred to is provided by combining, as constituents thereof, an amphoteric proteid such as casein, gelatine or glue; an alkali salt of an oxygen-containing acid, such as ammonium borate or sodium borate; water; a polyhydric alcohol such as glycerine, ethylene glycol, diethylene glycol or triethylene glycol; and an oxygen-containing acid such as boric acid, oxalic acid or citric acid.

My invention resides in the improved construction and method of the character hereinafter described and claimed.

Figure 1:
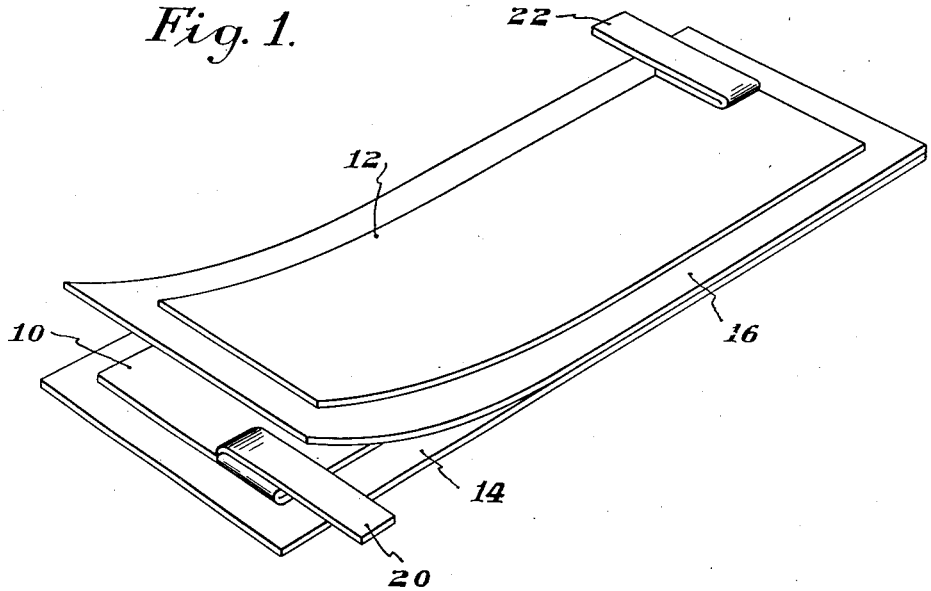
Figure 2:
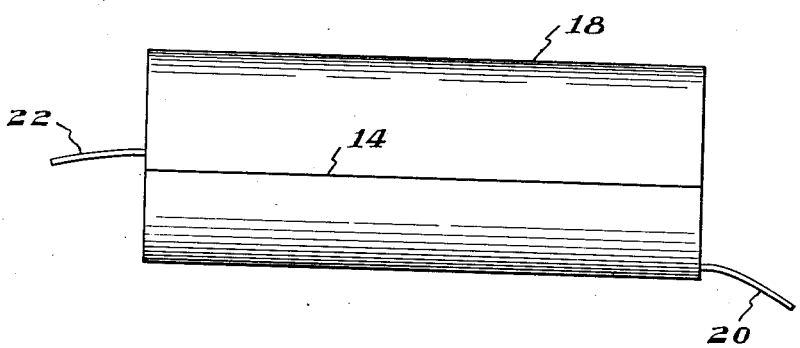

For the purpose of illustrating my invention, an embodiment thereof is shown in the accompanying drawing, in which Figure 1 is a perspective view showing one manner in which the electrodes and electrolytes might be combined in making the condenser; and Fig. 2 is a side elevational view of the complete condenser.

With reference to Fig. 1, the condenser is comprised of electrodes in the form of sheets 10 and 12 of film-forming foil material, the sheets being provided over the respective surfaces thereof with a dielectric film. Electrolytes, in the form of sheets 14 and 16, are placed as shown to separate the electrodes 10 and 12, and the combination is rolled upon itself to form the complete condenser 18, as shown in Fig. 2.

For the purpose of making connection to the electrode 10, the same is slit transversely at one end thereof and then folded over upon itself at the slit. The free strip provided by the slit is then folded over as shown in Fig. 1, to make the connection tab 20 which extends beyond the adjacent edges of the sheets. The opposite end of the electrode 12 is slit and folded in the same manner to form a tab 22 which extends outwardly beyond the adjacent edges of the sheets for making connection to the electrode 12.

With regard to manufacture of the electrolyte sheets, satisfactory results have been obtained by proceeding as follows: Ten parts by weight of ammonium borate are dissolved in one hundred and fifty parts by weight of water. To this solution fifty parts by weight of casein are added and the whole agitated by stirring until the casein is completely dissolved. To this solution are added ninety-four and one-half parts by weight of glycerine and sixty-two and one-half parts by weight of boric acid. Heat is then applied, and the temperature increased at a relatively low rate, with constant agitation to prevent foaming and local over-heating with consequent charring or decomposition of the casein, until the temperature is about 115° C. The electrolyte material is then ready for use.

Instead of casein, it is proposed to use other amphoteric proteids such as gelatine and glue. Instead of ammonium borate, it is proposed to use other alkali salts of oxygen-containing acids, such as sodium borate. Other polyhydric alcohols such as ethylene glycol, diethylene glycol or triethylene glycol, may be used instead of glycerine. Furthermore, other oxygen-containing acids such as oxalic acid and citric acid may be used instead of boric acid.

The proportions specified above are not critical in any strict sense of the word, and may be varied over a substantial range, depending upon the nature of the constituents used and the particular requirements.

The temperature of cooking may also vary, and is dependent to a certain extent upon the electrical characteristics desired in the finished condenser, as will be well understood.

In making the condensers, the electrolyte material may be poured upon the individual plates of the condenser to the required depth, and the unit assembled by stacking. If the condenser is to be made by rolling, as in Figs. 1 and 2, the material may be extruded into sheets of the desired thickness, or allowed to solidify and then sliced into sheets of the desired thickness.

From the foregoing it will be seen that I have provided an improved electrolytic condenser in which the electrolyte separating the electrodes also functions as a spacer for the electrodes. Further, it will be seen that by my invention an electrolyte is provided by which electrolytic condensers of the character referred to can be made having advantages over those constructed heretofore in the way of higher capacity, lower power factor, and cheapness and ease of manufacture.

It will be understood that modifications, within the conception of those skilled in the art, are possible without departing from the spirit of my invention or the scope of the claims.

I claim as my invention:

1. For use in electrolytic capacitors as an electrode-spacing means, an electrolyte comprised of casein in an amount sufficient to constitute an active ingredient, ammonium borate, glycerine, boric acid and water.

2. For use in electrolytic capacitors as an electrode-spacing means, an electrolyte comprised of casein in an amount sufficient to constitute an active ingredient, ammonium borate, ethylene glycol, boric acid and water.

3. A film forming electrolyte for electrolytic condensers comprising casein, a polyhydric alcohol, an alkaline salt of a weak acid, and water.

ARTHUR T. HARDING.